United States Patent [19]

Peterson

[11] 4,052,714
[45] Oct. 4, 1977

[54] ELECTROGRAPHIC RECORDING HEAD HAVING AN INTEGRAL RECORDING ELECTRODE CLEANING MEANS

[75] Inventor: Dean M. Peterson, Littleton, Colo.

[73] Assignee: Honeywell Inc., Minneapolis, Minn.

[21] Appl. No.: 654,565

[22] Filed: Feb. 2, 1976

[51] Int. Cl.² .................... G03G 15/048; G03G 17/00
[52] U.S. Cl. ............................... 346/155; 346/139 C; 346/165
[58] Field of Search ............ 346/74 S, 74 SB, 74 SC, 346/74 E, 74 EH, 139 C, 162–165, 155

[56] References Cited

U.S. PATENT DOCUMENTS

| | | | |
|---|---|---|---|
| 2,959,636 | 11/1960 | Lemelson | 346/139 C |
| 3,267,485 | 8/1966 | Howell et al. | 346/74 EH |
| 3,429,991 | 2/1969 | Ortlieb | 346/74 SB |
| 3,470,563 | 9/1969 | Starr, Jr. | 346/74 EH |

Primary Examiner—Jay P. Lucas
Attorney, Agent, or Firm—Laurence J. Marhoefer; Lockwood D. Burton; Mitchell J. Halista

[57] ABSTRACT

A recording head for electrographic recording has a plurality of electrically conducting flat plate electrodes arranged in a side-by-side electrically insulated relationship on an electrically insulating common support bar. A recording end of each electrode has a recording pin which is offset with respect to a center line of the electrode while a terminal end of each electrode has an electrical connection terminal. An air plenum is formed between the support bar and the electrodes by an adjacent cavity in each of the electrodes to allow a supply of air to be supplied to each of the electrodes. An air passage is formed by a depression in a surface of each of the electrodes extending between the air plenum and an exterior surface adjacent to the recording pin. A pair of end plates are arranged to provide an air-tight seal with the ends of the stacked electrodes and to provide hose connection means for admitting air from an air source into the air plenum.

9 Claims, 5 Drawing Figures

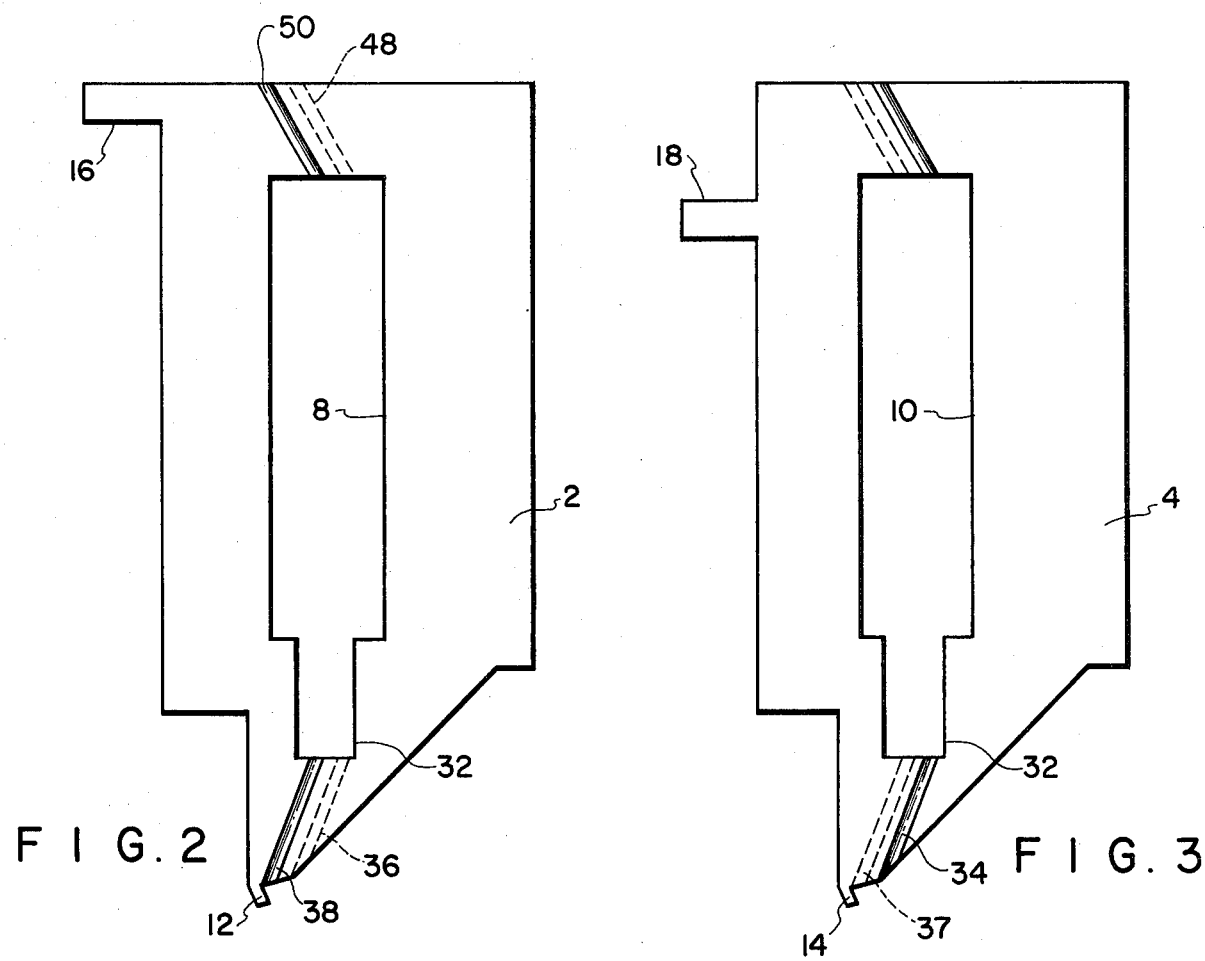
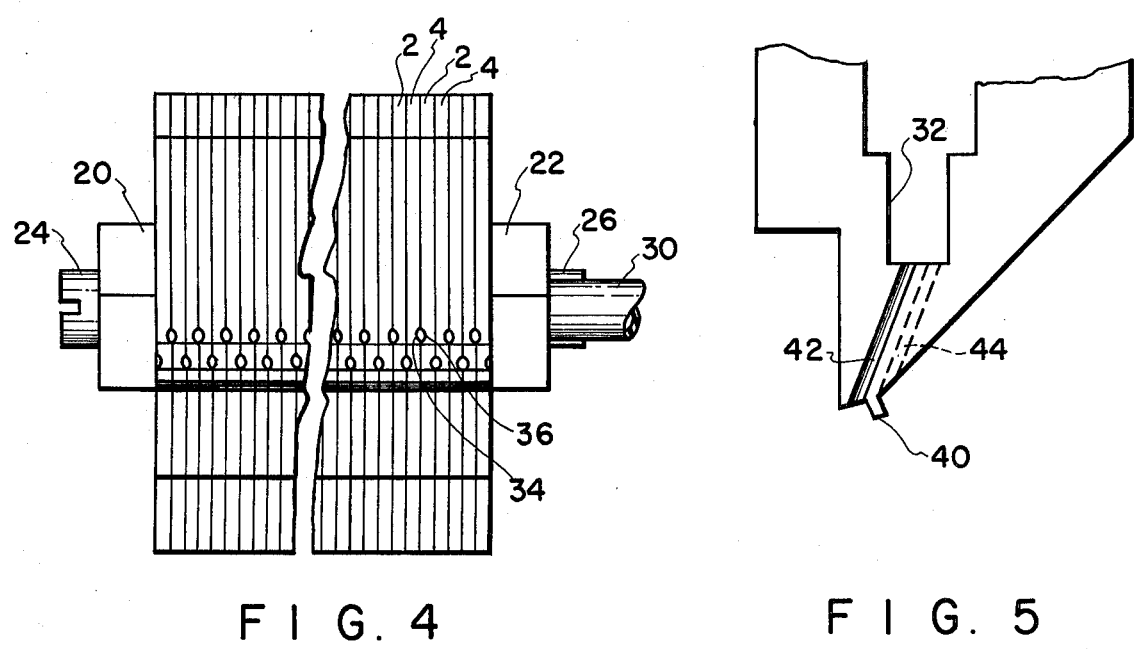

ELECTROGRAPHIC RECORDING HEAD HAVING AN INTEGRAL RECORDING ELECTRODE CLEANING MEANS

CROSS-REFERENCE TO COPENDING APPLICATIONS

Subject matter shown but not claimed herein is shown and claimed in U.S. application Ser. No. 611,665 of Paul A. Diddens and Dean M. Peterson entitled "Electrographic Recording Head" and assigned to the same assignee as the present application.

BACKGROUND OF THE INVENTION

1. Field of the Invention

The present invention relates to electrographic recording. More specifically, the present invention is directed to a multistylus electrographic recording head having recording electrodes and air supply means for cleaning recording debris from the electrodes.

2. Description of the Prior Art

Numerous prior art processes are available using electrographic techniques with the recording, or printing, of alpha-numeric representations, diagrams, facsimile reproductions and the like. Multistylus structures are used in the prior art for the recording head, e.g., a plurality of separate print wires embedded in a monolithic support such as those as shown in U.S. Pat. Nos. 3,381,300; 3,521,293, or a plurality of electrodes formed on a printed circuit board such as those shown in U.S. Pat. Nos. 3,618,118; 3,702,001; and 3,733,613. These prior art recording heads are used in various non-inpact electrographic recording operations such as electrostatic, electrolytic, spark recording, etc. One usual method of construction of the prior art multistylus head array for such electrographic recording involves the accurate placement of a plurality of small diameter wires in a technique requiring elaborate fixtures and other locating devices to provide adequate final construction tolerances. Further, making electrical connections to the electrode wires in such a prior art recording head, which wires are usually closely spaced in the head array, is a serious problem due to the tolerances involved. Commonly, the attachment of such electrical connections often leads to mechanical damage to the print head and electrical short circuits between electrode wires in the recording head. Finally, the use of the print wires in the prior art recording heads fails to provides means for cleaning of the electrode wires during the printing process to remove accumulated debris derived from the vaporized recording medium. Accordingly, it is desirable to provide an electrographic recording head assembly which avoids the aforesaid problems of the prior art techniques to produce a recording head assembly which is capable of being inexpensively produced while providing superior means for electrical connections thereto and cleaning of the recording electrodes.

SUMMARY OF THE INVENTION

An object of the present invention is to provide an improved electrographic recording head assembly for accurately positioning the recording electrodes, providing separate electrical connections to adjacent electrodes and incorporating means for cleaning or recording debris from the recording electrodes.

In accomplishing this and other objects, there has been provided, in accordance with the present invention, a recording head having a layered stack of flat plate electrodes with a common mounting means securing the electrodes in a predetermined orientation on the common mounting means. Each of the recording electrodes has a recording pin extending therefrom. Each electrode is also provided with an electrical connection terminal, an air plenum chamber and an air passage from the plenum chamber to an external surface adjacent to the recording pin.

BRIEF DESCRIPTION OF THE DRAWINGS

A better understanding of the present invention may be had when the following detailed description is read in connection with the accompanying drawings, in which:

FIG. 2 is a pictorial representation of a first type of electrode used in the recording head structure of FIG. 1, FIG. 3 is a pictorial representation of a second type of electrode used in the recording head structure of FIG. 1, FIG. 4 is a bottom view of an assembled print head embodying the present invention and showing the recording pin ends of the recording head, FIG. 5 is a pictorial illustration of a portion of a printing electrode at a recording pin end showing a modification of the electrode embodiment shown in FIGS. 2 and 3.

DETAILED DESCRIPTION

Figure 1:
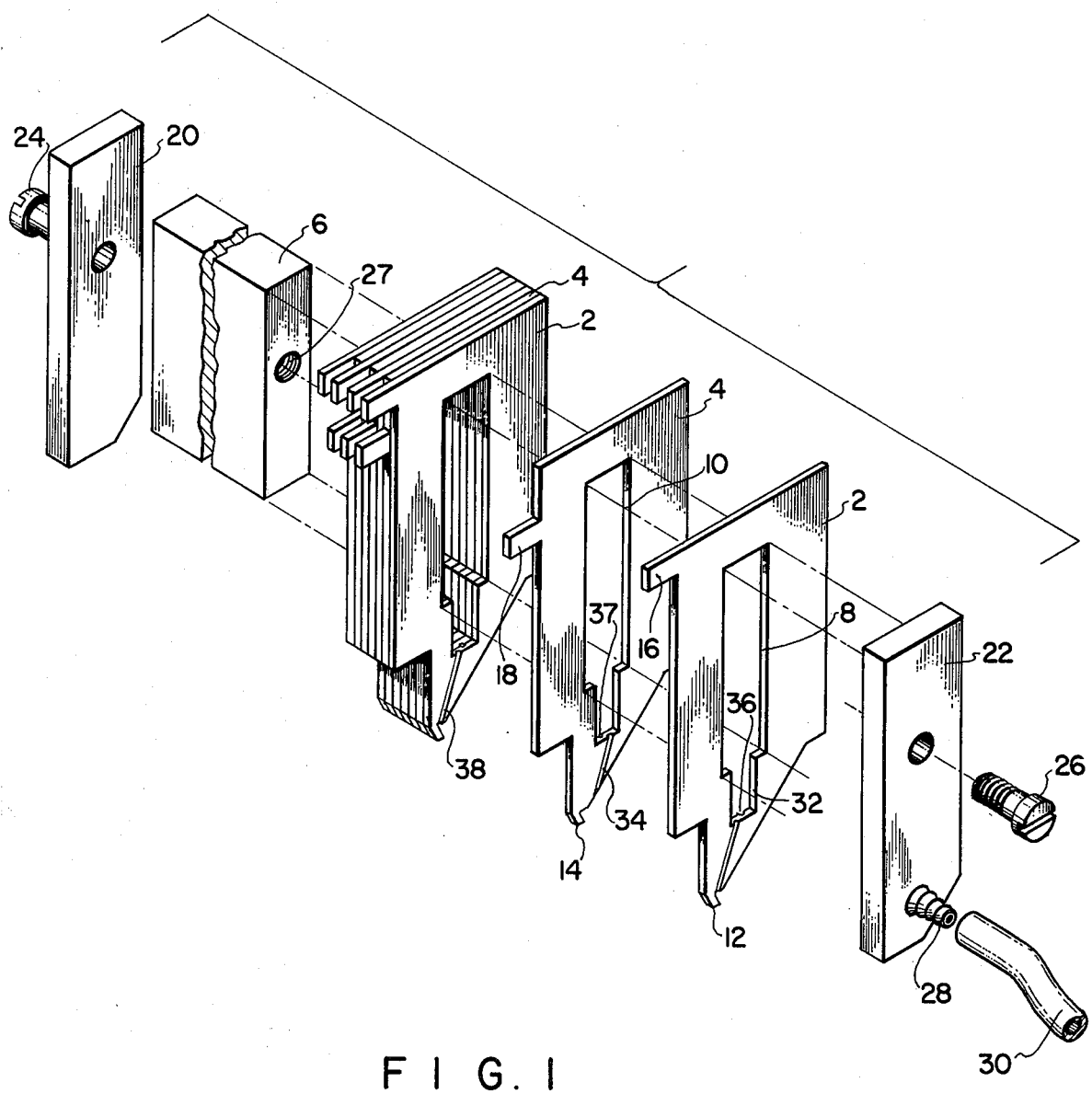
FIG. 1 is an exploded pictorial representation of a recording head structure embodying the present invention.

Referring to FIG. 1 in more detail, there is shown an exploded pictorial representation of an electrographic recording head embodying the present invention and having a first type of recording electrode 2 and a second type of recording electrode 4 arranged in a layered stack of alternating electrode types. The first and second electrodes 2 and 4 are each thin flat plates of an electrically conductive material, e.g., metal. A common rectangular cross-section support bar, or skewer, 6 of an electrically insulating material is arranged to pass through a closely fitting rectangular slot 8 in the first electrode 2 and a similar slot 10 in the second electrode 4. The first electrode 2 has a recording pin 12 located at one end thereof, i.e., a recording end, while the second electrode 4 has a similar recording pin 14 also located at one end thereof. The recording pins 12 and 14 may be offset with respect to the center-line of the slots 8 and 10, respectively in order to obtain a desired stance on a recording medium. Additionally, the first electrode 2 has an electrical connection terminal 16 located at an electrode end, i.e., a terminal end, opposite to the electrode recording end having the recording pin 12. Similarly, the second type of electrode 4 has an electrical connection terminal 18 located at a terminal end of the electrode 4 opposite to the recording end having the recording pin 14. The electrical connection terminals 16 and 18 are, also, preferably offset with respect to each other to preserve electrical isolation between adjacent electrodes and to facilitate the making of electrical connections thereto.

The electrodes 2 and 4 can be electrically insulated from each other by an electrically insulating coating (not shown) deposited on adjacent inter-electrode sides of the electrodes 2 and 4 or by the use of insulating spacers (not shown) mounted on the support bar 6 between each of the electrodes 2 and 4.

A pair of end plates 20 and 22 are arranged to be mounted on the corresponding ends of the layered stack of electrodes and fastened to the skewer 6 by bolts 24 and 26, respectively, engaging corresponding threaded holes in the ends of the skewer 6, e.g., threaded hole 27. One of the end plates, e.g., end plate 22, is arranged to have a hose connection 28 thereon for connection to a hose 30 connected to a source of pressurized air (not shown). An air plenum segment is formed in each electrode by an air chamber slot 32 located beneath the skewer slots 8 and 10 in each of the electrodes 2 and 4. The ends of a composite air plenum formed by the aligned air chamber slots 32 in the layered electrode stack are sealed by the end plates 20 and 22 to retain the pressurized composite air in the air plenum. Each of the electrodes 2 and 4 has an air passage connecting the plenum forming slot 32 to an exterior surface of the corresponding electrode adjacent to the respective recording pin. Specifically, each electrode has a pair of semi-cylindrical grooves formed in respective external surfaces located between the layered electrodes. These grooves are arranged to mate with similar grooves in adjacent electrodes to form cylindrical air passages, e.g., the electrode 4 has a groove 34 which mates with a groove 36 in adjacent electrode 2 while a groove 37 on the other side of electrode 4 mates with a groove 38 in the electrode 2.

The grooves on each electrode are staggered with respect to each other, due to the thinness of the sheet material forming the electrode, to allow sufficient depth to the grooves on opposite sides of the electrode while preventing interference between the grooves. The grooves on adjacent electrodes are, accordingly, oppositely staggered to allow the groove aforesaid mating to be achieved whereby the stack of electrodes 2 and 4 form a plurality of air passages between the composite air plenum formed by the slots 32 and respective ones of the recording pins 12 and 14. The grooves may be formed in the electrodes by any suitable well-known technique, e.g., coining. The air supplied over the air hose 30 is applied to plenum slots 32 through the hose connection 28 and, then, via the air passages formed by the aforesaid grooves on the electrodes 2 and 4 to clean the recording debris from the recording pins 12 and 14 and the surface of the recording medium (not shown). The recording electrodes are individually energized during a recording operation by electrical signals applied to the terminals 16 and 18 from electronic circuits, or sub-assemblies, (not shown) connected to the terminals 16 and 18 to form a recording apparatus utilizing the composite electrode assembly shown in FIG. 1.

In FIG. 1, the grooves are shown to be entirely on the same side of the recording pin while in FIG. 5, a modification of an electrode recording end is shown wherein the grooves on an electrode terminate on opposite sides of a recording pin on the corresponding electrode to clear debris from both sides of the recording pin. In this embodiment, the recording pin 40 is located closer to the center-line of the electrode to provide a space for the termination of a first groove 42 on the other side of the pin 40 from the termination of a second groove 44.

In FIGS. 2 and 3, there are shown side views of one side of modified forms of each of the electrodes 2 and 4. The modified electrodes 2A and 4A are modified in order to provide cooling air to electronic subassemblies, not shown, which are connected to the terminals 16 and 18 as well as an air flow to clean away recording debris. In such a modification additional air grooves, e.g., grooves 48, 50, may be provided from the interior of the electrodes to a location adjacent to the aforesaid electronic subassemblies. The skewer 6 may be provided with air passages (not shown) connecting the additional grooves with the composite air plenum or other means may be employed to supply air to these additional air grooves 48, 50. These additional grooves 48, 50 are also preferably staggered to mate with grooves in adjacent electrodes to form cylindrical air passages as in the case of the previously discussed grooves 34, 36, 37, and 38 used to supply air to the recording pins. It should be noted that other arrangements of the terminals 16, 18, the air grooves, the air plenum and the recording pins 12 and 14 may be used without departing from the scope of the present invention.

Accordingly, it may be seen that there has been provided, in accordance with the present invention, an improved electrographic recording head assembly and including means for cleaning recording debris from the recording pins of the recording electrodes.

The embodiments of the invention in which an exclusive property or privilege is claimed are defined as follows:

1. An electrographic recording head comprising
an electrode support means,
an electrode means mounted on said support means and including a plurality of electrode plates with each plate having a slot therein and said electrode support means including a common support bar fitting within said slot to mount said electrode means in a layered arrangement of said electrode plates thereon, each of said electrode plates having a recording pin and an electrical connection terminal as extensions thereof,
said electrode means having an internal air plenum within said electrode plates and an air passage means from said air plenum to a location adjacent to said recording pin of each of said electrode plates and
sealing means in contact with said electrode means for sealing said air plenum and for connecting said air plenum to an air source.

2. An electrographic recording head as set forth in claim 1 wherein said air plenum includes a slot in said electrode means and said air passage means extends between said slot and said recording pin.

3. An electrographic recording head as set forth in claim 2 wherein said sealing means includes at least one plate attached to said support means and arranged to cover said slot.

4. An electrographic recording head as set forth in claim 3 wherein said plate includes connection means for connecting said slot to an air source.

5. An electrographic recording head comprising
an electrode support means,
an electrode means mounted on said support means and having a recording pin and an electrical connection terminal, said electrode means including a plurality of electrode plates each having a slot therein and said electrode support means including a common support bar fitting within said slot to mount said electrode means in a layered arrangement of said electrode plates thereon, wherein said plates are electrically insulated from each other and are of an electrically conductive material and said mounting bar is of an electrically insulating material.

6. An electrographic recording head as set forth in claim 5 wherein said air plenum includes a second slot in each of said plates and said second slot being aligned in the layered stack to form said plenum and said air passage means includes a groove formed in a surface of said plates and extending between said second slot and said recording pin.

7. An electrographic recording head as set forth in claim 6 wherein said sealing means includes a pair of plates attached to respective ends of said mounting bar and aligned with said second slot in an adjacent one of said electrode means.

8. An electrographic recording head comprising
an electrode support means,
an electrode means mounted on said support means and having a recording pin and an electrical connection terminal, wherein said electrode means includes a plurality of flat electrode plates each having a slot therein, said flat plates being electrically insulated from each other and of an electrically conductive material and said electrode support means is a common support bar fitting within said slot to mount said electrode means in a layered arrangement of said flat plates thereon, said mounting bar being of an electrically insulating material,
said electrode means having an internal air plenum and an air passage means from said air plenum to a location adjacent to said recording pin, and
sealing means in contact with said electrode means for sealing air plenum and for connecting said air plenum to an air source.

9. An electrographic recording head as set forth in claim 8 wherein said air plenum includes a second slot in each of said flat plates, said second slot being aligned in the layered stack to form said air plenum and said air passage means includes a groove formed in a surface of each of said flat plates and extending between said second slot and said recording pin and said sealing means includes a pair of end plates attached to respective ends of said mounting bar and aligned with said second slot in an adjacent one of said electrode means and one of said end plates includes connection means for connecting said second slot to an air source.

* * * * *